US005355741A

United States Patent [19]
Hsieh

[11] Patent Number: 5,355,741
[45] Date of Patent: Oct. 18, 1994

[54] FAILSAFE LIMIT SWITCH WITH AUTOMATIC RESET FOR ROLLING FIRE DOOR

[76] Inventor: Tsung W. Hsieh, 25 Fen-Liao Road, Tung-Lin, Lin-Ko, Taipei County, Taiwan

[21] Appl. No.: 965,724

[22] Filed: Oct. 23, 1992

[51] Int. Cl.[5] .......................... G01G 17/00; E06B 9/56

[52] U.S. Cl. .......................................... 74/2; 74/500.5; 160/293.1

[58] Field of Search ...................... 74/2, 500.5; 160/7, 160/9, 188, 291, 292, 293.1, 294, 295

[56] References Cited

U.S. PATENT DOCUMENTS

| | | | |
|---|---|---|---|
| 1,254,149 | 1/1918 | Miller | 160/7 |
| 2,478,138 | 8/1949 | Tobias | 74/2 |
| 2,960,297 | 11/1960 | Cotter | 74/2 X |
| 3,006,196 | 10/1961 | Brackett | 74/2 |
| 5,245,879 | 9/1993 | McKeon | 74/2 |

FOREIGN PATENT DOCUMENTS

| | | | |
|---|---|---|---|
| 710292 | 9/1941 | Fed. Rep. of Germany | 74/2 |
| 2182738 | 5/1987 | United Kingdom | 160/291 |

*Primary Examiner*—David W. Laub
*Attorney, Agent, or Firm*—Bucknam and Archer

[57] ABSTRACT

A failsafe limit switch with automatic reset for a rolling fire door is usable together with a rolling door with a brake. There is a movable plunger between a secured position and a triggered position which compresses a spring as it moves from its triggered position to its secured position. A movable catch between the engaged position and the released position holds the plunger in the secured position when the catch is in the engaged position under the impetus of the spring when the catch is in the released position. When the catch is in the released position, it also closes the contacts of a normally open switch; and if the catch is in the engaged position, it allows the contacts of the switch to open. The switch is wired in series with a solenoid; the movable arm of the solenoid acts to move the plunger from the triggered position to the secured position when the solenoid is energized. A collar constrained against rotation is threadably mounted on a shaft, the linear position of the collar with respect to the catch is a function of the angular position of the shaft. For a specific angular rotation of the shaft, the collar contacts and releases the catch.

7 Claims, 2 Drawing Sheets

FAILSAFE LIMIT SWITCH WITH AUTOMATIC RESET FOR ROLLING FIRE DOOR

FIELD OF INVENTION

This invention relates to a limit switch for rolling fire doors, especially a failsafe electromechanical limit switch with an automatic reset, usable with an automatically resettable failsafe door release mechanism with a brake.

BACKGROUND OF INVENTION

It is highly desirable to brake a rolling slatted door just before full door closure to reduce its downward velocity and therefore preclude the possibility of buckling the door upon full closure. Such braking eliminates the need for increased structural strength to withstand impact loading which would otherwise occur.

In the present art , this braking action is usually accomplished by changing the state of the contacts of an electrical limit switch when the door reaches a predetermined height near its fully closed position. The activation of the limit switch then activates a brake on the door's roller, slowing the door while still maintaining tension during its final closure. If applicable, power to the door's motor is also cut simultaneously by activation of the limit switch.

The design works well during powered operation of the door and during emergency operation of the door as long as electrical power is available. However, building fires are often preceded by electrical power failure, therefore failsafe operation of fire doors during an unpowered condition still requires that they be designed for buckling loads on impact. Battery backup for the electrical limit switches and associated system components has been suggested to overcome this problem, however, such battery backup is frowned upon because of the possibility of several undetermined existing problems.

In a conventional art by McKeon Rolling Steel Door Co., Inc., 95 29th Street, Brooklyn, N.Y. 11232, as shown in the Catalog thereof, in order to counterbalance the weight of the curtains at every point of travel, doors are counterbalanced by means of adjustable steel helical torsion springs attached to a shaft enclosed in a pipe with required mounting blocks or rings for attachment of curtains.

With the advent of the failsafe fire door release mechanism having automatic reset as described by McKeon in U.S. patent application Ser. No. 5,245,879, granted Sep. 21, 1993, a need arose to have an associated failsafe automatically resettable limit switch which would activate the unit's brake to brake the door when the door reached a predetermined point during its closure, yet be fully and automatically resettable during powered operation by simply pressing the "UP" button on the door control panel, thus allowing full normal operation of the door without any further intervention by the person operating the door.

SUMMARY OF THE INVENTION

It is an object of the present invention to provide an automatically resettable failsafe limit switch to assure accurate braking under normal or abnormal working conditions such as a worn-out rolling door after repeated operation, so that the door won't be damaged. This shortcoming has not yet been solved up to this date. In this failsafe switch, because of a movable plunger between a first secured position and a second triggered position stores mechanical energy in a mechanical energy storage means (such as a spring) as it moves from the triggered position to the secured position, it becomes capable of pulling a cable, moving a linkage or the like to transfer its movement external to the limit switch. The plunger is held in the secured position by a catch. The catch keyed to the angular displacement of a rotatable input shaft trips the limit switch by moving the catch into the released position when a selectable value of the shaft's angular displacement is exceeded. In response to the release of the catch, the plunger moves to the triggered position under the impetus of the energy storage means. The power of the plunger movement will be transferred to pull the brake of the motor-operator unit by means of a cable or other linkage. A solenoid connected to the plunger moves the plunger from the triggered position to the secured position upon application of electrical power, next, the catch automatically secures the plunger and resets the limit switch.

The object and efficacy of this invention can be understood more clearly by the accompanying drawings.

DETAILED DESCRIPTION OF A PREFERRED EMBODIMENT

Figure 1:
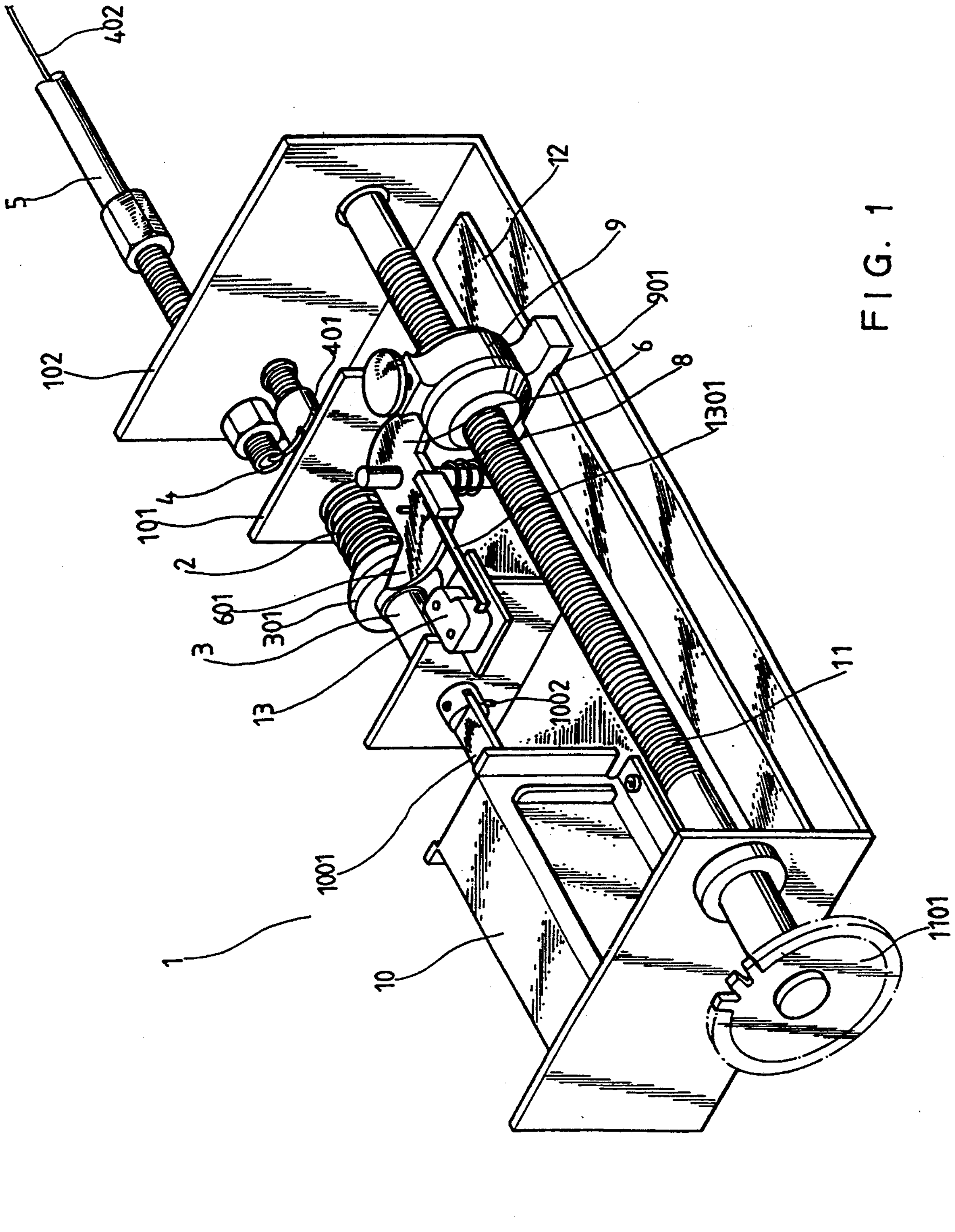
FIG. 1 is a perspective view of the preferred embodiment of the invention with the cover removed.
Figure 2:
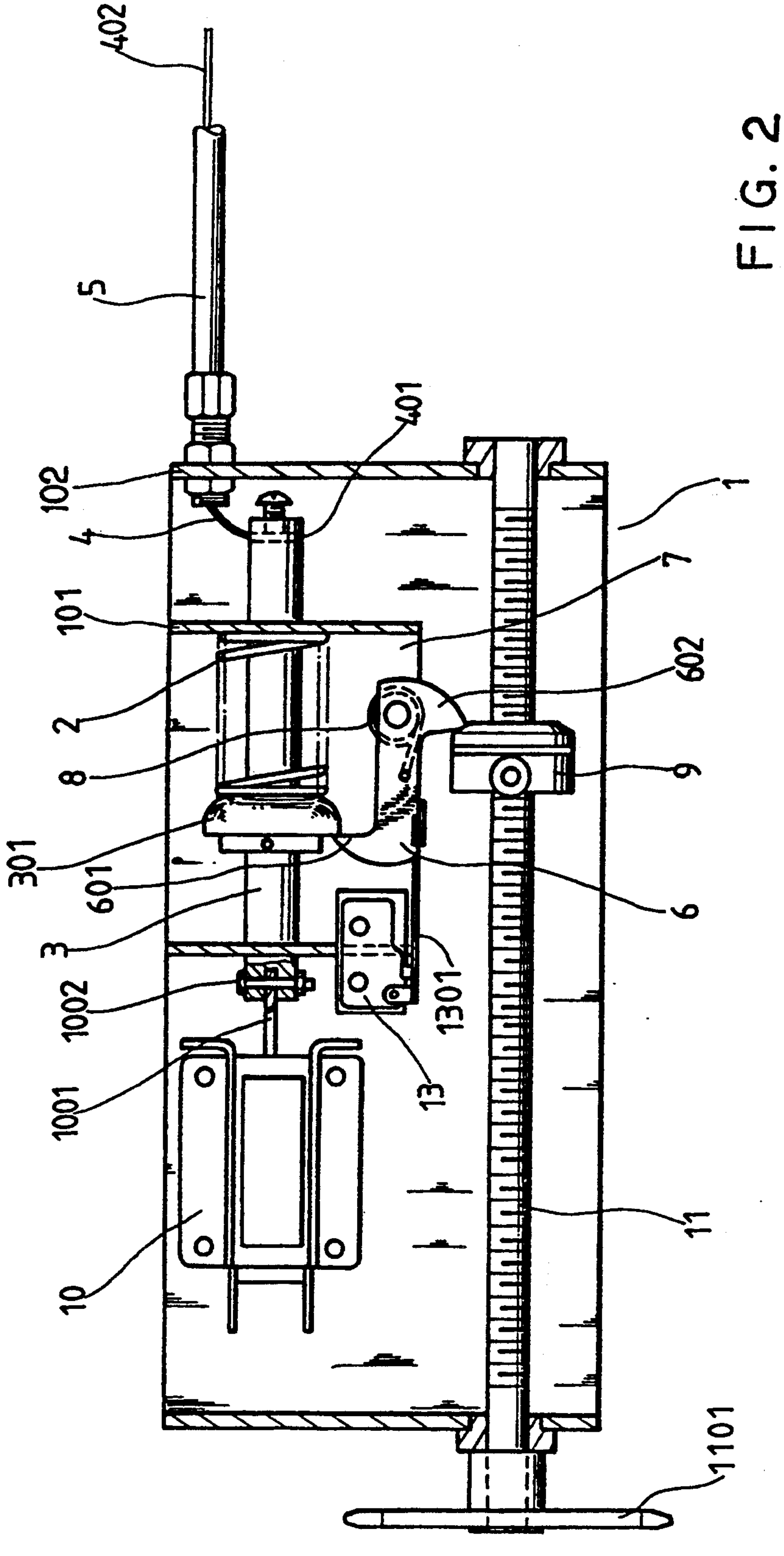
FIG. 2 shows the top view of FIG. 1.

Referring to FIG. 1 or FIG. 2, a failsafe, automatically resettable limit switch (1) in its preferred embodiment is comprised of a spring loaded plunger (3) movable between a first secured position and a second triggered position. One end of the spring is located against the wall (101) while the other end is inserted into disk (301). In the figures shown, plunger (3) is in the secured position and spring (2) is in compressed state. Cable (4) having a first end (401) and a second end (402) passes through a cable guide tube (5) secured through a vertical wall (102). First end (401) is attached to plunger (3) and second end (402) extends beyond guide (5) and is finally connected to a brake of a conventional braking system.

Catch (6), pivotally mounted to frame (7) (in FIG. 2) and movable between an engaged position and a released position, is normally held in the engaged position by torsion spring (8) and in this engaged position holds plunger (2) in the plunger's secured position. As shown, catch (6) has a left hook (601) to hold disk (301) as shown in the figures and a right hook (602) to hold collar (9). Alternatively, catch (6) can be designed so that it returns to its normally engaged position under the impetus of gravity or other means instead of by torsion spring (8) but the use of torsion spring (8) is preferred.

Movable solenoid arm (1001) of solenoid (10) is attached to plunger (3) by a screw (1002) so that when solenoid (10) is energized arm ( 1001 ) moves plunger ( 3 ) from its triggered position to its secured position by overcoming the force of spring (2).

At the bottom of the collar (9), a slot (901) is cut to mate a rail (12). Collar (9), threadably mounted on a rotatable shaft (11) but constrained against rotation itself, moves linearly along shaft (11) as shaft (11) rotates, its linear motion relative to catch (6) keyed to the angular position of shaft (11). Accordingly, the starting position of the collar (8) can be pre-determined, so that when shaft (11) is rotated to a specific angular position, collar (8) touches hook (602) and then releases catch (6) causing plunger (3) to move from the secured position to the triggered position, drawing cable (402) toward limit switch (1) and simultaneously closing the contacts of normally open switch (1). Electrical switch (13) is wired in series with solenoid (10) only when limit switch (1) is activated and electric power is applied to limit switch (1). This allows solenoid (10) to be energized only when automatic resetting of limit switch (1) is needed and off at all other times. Electric power is supplied to limit switch (1) through the unconnected terminal of normally open electrical switch (13) and the unconnected terminal of solenoid (10).

Although this invention can be applied with any rolling door having mechanical brake actuation means, the following example illustrates how to use the invention with a rolling fire door with the improved motor-operator unit as described by McKeon in U.S. Patent application Ser. No. 5,245,879.

Their conventional rolling door usually possesses a shaft of a rolling door and a braking means. At one end of the rolling door shaft, a sprocket wheel is located and a limit switch is motivated by a chain. When the rolling door is lowered, braking function of the braking means is released, then the rolling door is released along a guiding rail from the rolling door shaft by its own gravity force. Thus the door is closed slowly.

Referring to FIGS. 1 and 2, to use limit switch (1) to brake a rolling fire door, one couples shaft (11) through a sprocket which (1101) to a shaft of the motor-operator unit or door roller (not shown) whose angular position is a function of the position of the door, thereby making the linear position of collar (9) relative to catch (6) a function of the position of the door. It is preferable to couple shaft (11) to the reversibly driven high speed shaft of a motor-operator unit such as that described by McKeon in U.S. Patent application Ser. No. 5,245,879, to obtain the best control over the exact door position where braking occurs. Of course, the chosen pitch of the threads on shaft (11) will be dependent on the total number of revolutions shaft (11) will make as the door moves from its fully open to its fully closed position. The second end (402) of cable (4) is connected to door brake actuating means, and slack is initially taken up in cable (4) , moving the second end (402) toward the tube (5) which will pull the brake actuating means and stop the door.

The following procedure is used to set the point of limit switch activation:

When limit switch (1) is installed as described above, the door is operated by pressing the "DOWN" button. This cuts power to the motor-operator, releasing the brake and allowing the door to descend. The door is stopped a few inches above its closed position by pressing the "STOP" button which re-applies electric power to the brake solenoid stopping the door. The position of collar (9) on shaft (11) is adjusted by removing the rotation constraint on collar (9) and spinning collar (9) relative to shaft (11) to a position just contacting catch (6). The rotation constraint on collar (9) is then re-installed. The door is raised by pressing the "UP" button and then lowered fully by pressing the "DOWN" button. Minor adjustments in the position of collar (9) relative to shaft (11) are done as previously described until the exact desired position of brake activation is achieved. This is the position where the door reaches full closure with little or no remaining downward velocity.

It is most preferred, but not necessary to incorporate the invention directly into the motor-operator unit of a rolling door to minimize field installation time. The operation of the invention in any event is transparent to the user as far as door operation is concerned. He raises the door by pressing the "UP" button, lowers it by pressing the "DOWN" button and stops it in any position by pressing the "STOP" button. In Emergency closure, where power is cut to the door either by the activation of an alarm system in response to a fire or by the absence of all electrical power, is the equivalent to pressing the "DOWN" button on the door control panel, which manually cuts power to the motor-operator, including the brake actuating solenoid to release the brake and allow the door to close. This should be kept in mind when reading the following description of the inventions operation when installed to operate a door:

Limit switch (1) is wired at the control panel so that electric power is applied to normally open switch (13) only when power is applied to the door's motor to raise the door. Those skilled in wiring door motor-operators can make the necessary connections. With the door in its fully closed position, limit switch (1) is tripped, plunger (2) is in its triggered position, cable (2) is retracted toward limit switch (1) applying brake actuating means (not shown), then, catch (6) is held in its released position by collar (9) thereby holding normally open electrical switch (13) through pivoting of its contact arm (1301) closed.

As soon as electric power becomes available to operate the door, and the "UP" button is pressed on the control panel, solenoid (10) becomes energized, solenoid arm (1001) moves plunger (3) from its triggered position to its .secured position by overcoming the force of spring (2). Simultaneously, the brake releasing solenoid in the motor-operator unit (not shown) is energized, releasing the brake and moving cable (4) through tube (5) away from limit switch (1) . The motor starts the door ascending, shaft (11) rotates causing collar (9) to move away from catch (6). Torsion spring (2) moves catch (6) away from its released position, to its engaged position, and in doing so, the normally open electrical switch opens 13 the deenergizing solenoid (10). Plunger (2) is then held in its secured position by catch (6). The failsafe electromechanical limit switch with automatic reset (1) is now fully reset and ready to again brake the door during the door's final inches of descent.

Although a specific embodiment of the present invention has been described in detail above, it is readily apparent that those skilled in the art may make various modification and changes to the present invention without departing from the spirit and scope thereof. These changes include but are not limited to the addition of different features to the invention, the substitution of equivalent elements of the invention which perform essentially the same function in essentially the same way to achieve the essentially the same result , or the incorporation of the invention as a part of other equipment especially, motor-operator units of rolling doors. It is to be expressively understood that the scope of the invention is defined by the following claims.

It is understood by those skilled in the art that this invention should not be construed as restricted to the above described embodiment and that various changes and modifications may be made in the invention without departing from the gist and scope thereof.

Other objects and advantages of the present invention will become apparent from the detailed description above taken in conjunction with the appended claims.

What is claimed is:

1. A failsafe limit switch with automatic reset, comprising of:

(a) a plunger movable between a first secured position and a second triggered position, said plunger storing mechanical energy in an energy storage means as said plunger moves from said second triggered position to said first secured position; and (b) a catch, said catch movable between a normally engaged position and a released position, said catch in said normally engaged position holding said plunger in said first secured position, said catch in said released position allowing said plunger to move into said triggered position under the impetus of said energy storage means ; and (c) a solenoid with a movable arm attached to said plunger, said arm moving said plunger from said second triggered position to said first secured position when said solenoid is energized; and (d) a reversibly rotatable input shaft; and (e) a collar, said collar's position relative to said catch responsive to the angular displacement of said input shaft, said collar contacting and moving said catch from said normally engaged position to said released position beyond a particular angular displacement of said input shaft; and (f) a means for remotely communicating the movement of said plunger from said secured position to said triggered position.

2. The failsafe limit switch of claim 1 further comprising an electrical switch, said switch wired in series with said solenoid, said catch in said released position closing said switch, said electrical switch opening in response to said catch moving from said released to said engaged position.

3. The failsafe limit switch of claim 2 further comprising a torsion spring, said spring applying a force tending to move said catch from said released position to said engaged position.

4. The failsafe limit switch of claim 1 wherein said energy storage means is a second spring.

5. The failsafe limit switch of claim 1 wherein said means for remotely communicating the movement of said plunger from said secured position to said triggered position comprises:

(a) a cable with a first end and a second end, said first end connected to said plunger; and (b) a tube, said cable passing through said tube, said second end extending beyond said tube.

6. The failsafe limit switch of claim 2 further comprising a means for adjusting said particular angular displacement of said input shaft where said collar contacts said catch.

7. The failsafe limit switch of claim 1 wherein said collar is threadably mounted on said input shaft and constrained against rotation so that it travels on said input shaft as a linear function of the angular position of said shaft.

* * * * *